(12) United States Patent
Barak et al.

(10) Patent No.: US 8,554,776 B1
(45) Date of Patent: Oct. 8, 2013

(54) PRIORITIZING TASKS

(75) Inventors: Nimrod Barak, Tel Aviv (IL); Doron Lehmann, Kfar Vradim (IL)

(73) Assignee: SAP Portals Israel Ltd, Ra'anana (IL)

( * ) Notice: Subject to any disclaimer, the term of this patent is extended or adjusted under 35 U.S.C. 154(b) by 0 days.

(21) Appl. No.: 13/438,038

(22) Filed: Apr. 3, 2012

(51) Int. Cl.
*G06F 17/30* (2006.01)
(52) U.S. Cl.
USPC .......................................................... 707/748
(58) Field of Classification Search
USPC ........................................ 707/2, 3, 748; 705/9
See application file for complete search history.

(56) References Cited

U.S. PATENT DOCUMENTS

2010/0174578 A1* 7/2010 Duffy et al. ....................... 705/9

* cited by examiner

*Primary Examiner* — Etienne LeRoux
(74) *Attorney, Agent, or Firm* — Fish & Richardson P.C.

(57) ABSTRACT

Techniques for providing a prioritized task list to a mobile device including identifying a user profile in a portal that includes one or more associations between the user profile, associated with a user, and one or more content sources; comparing, for each task of one or more tasks, the content source associated with the task and the associations stored by the user profile, the content sources providing the tasks; ranking, based on the comparison, the tasks to define a ranked list of tasks; and preparing a subset of the ranked list of tasks for display on the mobile device.

21 Claims, 4 Drawing Sheets

PRIORITIZING TASKS

TECHNICAL BACKGROUND

This disclosure relates to prioritizing tasks and, more particularly, prioritization of tasks based on user interaction with the tasks.

BACKGROUND

When viewing and interacting with tasks in a virtual workspace, and specifically in mobile devices, there may be little or no control (e.g., prioritization) over which tasks are or should be displayed. Further, a mobile device can have a small screen area (e.g., screen real estate) for displaying a listing of such tasks. Thus, only a limited number of tasks may be presented by the mobile device as compared to a larger computing platform such as a desktop computer.

SUMMARY

This disclosure describes systems, methods, apparatus, and computer-readable media for providing a prioritized task list to mobile devices. In some embodiments, a user of a mobile device can be associated with a user profile in a portal. The user profile can include associations with content sources. The content sources provide tasks to the user. For example, a purchase order task can be provided by an accounting system source to a user (e.g., via the mobile device). Thus, the user profile associated with the user can be associated with the accounting system. The content source associated with a task can be compared to the associations stored by the user profile. The tasks can be ranked based on the comparison between the content sources associated with the tasks with the associations stored by the user profile. The ranking of the tasks can define a ranked list of tasks. This ranked list of tasks can be prepared for display on the mobile device.

A general embodiment of the subject matter described in this specification can be implemented in methods that include identifying a user profile in a portal that includes one or more associations between the user profile, associated with a user, and one or more content sources; comparing, for each task of one or more tasks, the content source associated with the task and the associations stored by the user profile, the content sources providing the tasks; ranking, based on the comparison, the tasks to define a ranked list of tasks; and preparing a subset of the ranked list of tasks for display on the mobile device.

Other general embodiments include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In a first aspect combinable with any of the general embodiments, comparing further includes comparing, for each task of the one or more tasks, a content source tag associated with the task and the associations stored by the user profile.

In a second aspect combinable with any of the previous aspects, comparing further includes matching one or more of the tasks with one or more of the associations based on the system associated with the task and the system of the associations.

In a third aspect combinable with any of the previous aspects, ranking further includes at least one of providing a ranking value to each of the tasks based on the comparison; or ordering the tasks based on the ranking value from a highest ranking value to a lowest ranking value.

A fourth aspect combinable with any of the previous aspects further includes receiving user feedback indicating user interaction with the tasks of the subset of the ranked list of tasks to define interacted-tasks; detecting, for each interacted-task, the content source associated with the interacted-task; storing, by the user profile associated with the user providing the user feedback, for each interacted-task, an additional association between the user profile and the content source associated with the interacted-task; comparing, for each task of one or more additional tasks, the content source associated with the additional task with the associations and the additional associations stored by the user profile; and ranking, based on the comparing, the additional tasks to define a ranked list of additional tasks.

A fifth aspect combinable with any of the previous aspects further includes providing, for each additional task, a ranking value to the additional task based on a type of the user interaction with the tasks of the subset of the ranked list of additional tasks.

In a sixth aspect combinable with any of the previous aspects, the user interaction includes at least one of viewing the additional task or changing a state of the additional task.

In a seventh aspect combinable with any of the previous aspects, the ranking value associated with the user interaction of changing the state of the additional task is greater than the ranking value associated with the user interaction of viewing the additional task.

In an eighth aspect combinable with any of the previous aspects, the associations are further between the user profile and a type of the task.

In a ninth aspect combinable with any of the previous aspects, the associations are further between the user profile and identifications of the content sources.

Various embodiments of a task prioritization module according to the present disclosure may have one or more of the following features. For example, only relevant tasks are provided to a user of a mobile device as compared to an entire listing of tasks normally provided to a user at a desktop computer. By providing only the relevant tasks to a mobile device, a user can improve efficiency while interacting with such tasks on the mobile device.

These general and specific aspects may be implemented using a device, system or method, or any combinations of devices, systems, or methods. The details of one or more implementations are set forth in the accompanying drawings and the description below. Other features, objects, and advantages will be apparent from the description and drawings, and from the claims.

DETAILED DESCRIPTION

This disclosure describes systems, methods, apparatus, and computer-readable media for providing a prioritized task list to mobile devices. In some embodiments, a user of a mobile device can be associated with a user profile in a portal. The user profile can include associations with content sources. The content sources provide tasks to the user. For example, a purchase order task can be provided by an accounting system source to a user (e.g., via the mobile device). Thus, the user profile associated with the user can be associated with the accounting system. The content source associated with a task can be compared to the associations stored by the user profile. The tasks can be ranked based on the comparison between the content sources associated with the tasks with the associations stored by the user profile. The ranking of the tasks can define a ranked list of tasks. This ranked list of tasks can be prepared for display on the mobile device.

Figure 1:
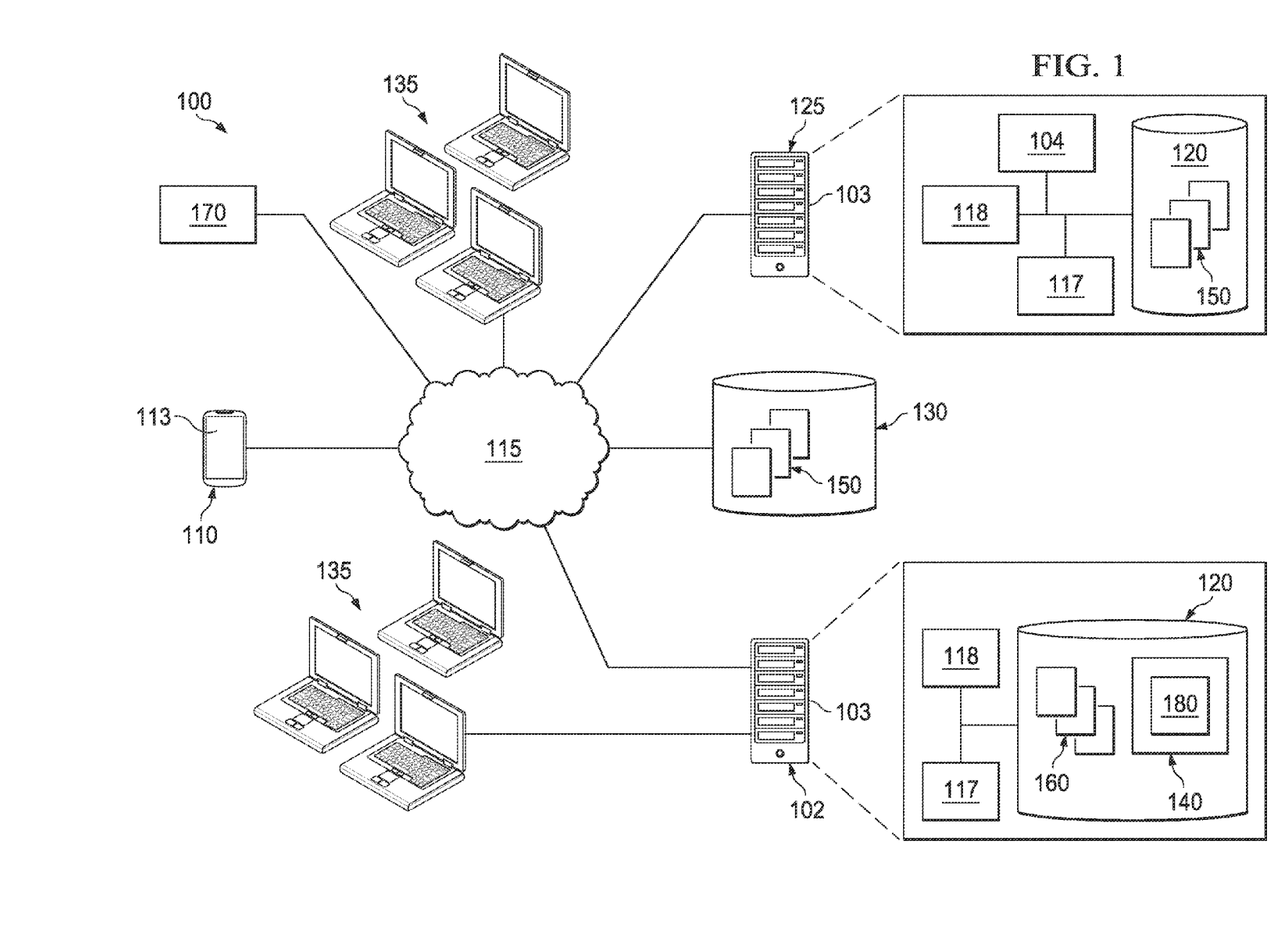
FIG. 1 illustrates an example distributed computing system operable to provide prioritized tasks to mobile devices.

FIG. 1 illustrates an example distributed computing system 100 operable to provide prioritized content to mobile devices. For example, the illustrated environment 100 includes or is communicably coupled with an enterprise computing system 102, a mobile communications device 110 ("mobile device"), a software provider computing system 125, a repository 130, one or more client computing devices 135 ("clients"), and a third party content provider 170, at least some of which communicate across a network 115. In some embodiments, the clients 135 can include the mobile device 110.

The enterprise computing system 102 and the software provider computing system 125 both include separate servers 103. In general, each server 103 stores one or more hosted applications, such as, for example, a task prioritization module 104, where at least a portion of the hosted applications are executed via requests and responses sent to users or clients within and communicably coupled to the illustrated environment 100 of FIG. 1. In some instances, the server 103 may store multiple various hosted applications, while in other instances, the server 103 may be a dedicated server meant to store and execute only a single hosted application (e.g., the task prioritization module 104). In some instances, the server 103 may include a web server, where the hosted applications represent one or more web-based applications accessed and executed via network by the mobile device 110, the clients 135, or both to perform the programmed tasks or operations of the hosted application.

At a high level, each server 103 includes an electronic computing device operable to receive, transmit, process, store, or manage data and information associated with the environment 100. For example, one or both of the servers 103 illustrated in FIG. 1 may be responsible for receiving application requests from one or more client applications associated with the mobile device 110, the clients 135 or both of the environment 100 and responding to the received requests by processing said requests in an associated hosted application, and sending the appropriate response from the hosted application back to the requesting client application. In addition to requests from the mobile device 110, the clients 135 or both illustrated in FIG. 1, requests associated with the hosted applications may also be sent from internal users, external or third-party customers, other automated applications, as well as any other appropriate entities, individuals, systems, or computers.

As used in the present disclosure, the term "computer" is intended to encompass any suitable processing device. For example, although FIG. 1 illustrates single servers 103 for each of the enterprise computing system 102 and software developer computing system 125, environment 100 can be implemented using two or more servers 103 for each computing system (102 and 125), as well as computers other than servers, including a server pool. Indeed, server 103 may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, illustrated server 103 may be adapted to execute any operating system, including Linux, UNIX, Windows, Mac OS, or any other suitable operating system.

The server 103 of software provider computing system 125 includes the task prioritization module 104. The illustrated task prioritization module 104 prioritizes tasks that are displayed to a user of the mobile device 110, the client devices 135, or both. The task prioritization module 104 compares sources associated with a task with associations stored by a user profile, and based on the comparison, the tasks can be prioritized (ranked), described further below. The illustrated task prioritization module 104 can be implemented by and stored by any combination of the enterprise computing system 102, the software providing computer system 125, the repository 130, the clients 135, and the mobile device 110.

Each of the illustrated servers 103 also includes an interface 117, a processor 118, and a memory 120. The interface 117 is used by the server 103 for communicating with other systems in a distributed environment—including within the environment 100—connected to the network 115; for example, the clients 135, the mobile device 110, or both, as well as other systems communicably coupled to the network 115. Generally, each interface 117 includes logic encoded in software and/or hardware in a suitable combination and operable to communicate with the network 115. More specifically, each interface 117 may include software supporting one or more communication protocols associated with communications such that the network 115 or interface's hardware is operable to communicate physical signals within and outside of the illustrated environment 100.

As illustrated in FIG. 1, each of the servers 103 includes a processor 118. Although illustrated as a single processor 118 in FIG. 1, two or more processors may be used according to particular needs, desires, or particular embodiments of the environment 100. Each processor 118 may be a central processing unit (CPU), a blade, an application specific integrated circuit (ASIC), a field-programmable gate array (FPGA), or another suitable component. Generally, the processor 118 executes instructions and manipulates data to perform the operations of the server 103. For example, the processor 118 executes the functionality required to receive and respond to requests from the clients 135 and/or the mobile device 110.

Regardless of the particular implementation, "software" may include computer-readable instructions, firmware, wired or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java, Visual Basic, assembler, Perl, any suitable version of 4GL, as well as others. While portions of the software illustrated in FIG. 1 are shown as individual modules that implement the various features and functionality through various objects, methods, or other processes, the software may instead include a number of sub-modules, third party services, components, libraries, and such, as appropriate. Conversely, the features and functionality of various components can be combined into single components as appropriate.

Each of the servers 103 also includes a memory 120, or multiple memories 120. The memory 120 may include any memory or database module and may take the form of volatile or non-volatile memory including, without limitation, magnetic media, optical media, random access memory (RAM), read-only memory (ROM), removable media, or any other suitable local or remote memory component. The memory 120 may store various objects or data, including classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the computing system 102, 125. Additionally, the memory 120 may include any other appropriate data, such as VPN applications, firmware logs and policies, firewall policies, a security or access log, print or other reporting files, as well as others.

The environment further includes a repository 130. In some embodiments, the repository 130 is an in-memory repository. The repository 130 can be a cloud-based storage medium. For example, the repository 130 can be networked online storage where data is stored on virtualized pools of storage.

The illustrated environment of FIG. 1 also includes one or more clients 135 and the mobile device 110, or multiple mobile devices 110. Each client 135 and/or the mobile device 110 may be any computing device operable to connect to or communicate with at least the computing systems 102, 125 and/or via the network 115 using a wireline or wireless connection. In general, each client 135 and/or the mobile device 110 includes an electronic computer device operable to receive, transmit, process, and store any appropriate data associated with the environment 100 of FIG. 1.

There may be any number of clients 135 and/or mobile devices 110 associated with, or external to, the environment 100. For example, while the illustrated environment 100 includes six clients 135 and one mobile device 110, alternative implementations of environment 100 may include a single client 135 or multiple mobile devices 110 communicably coupled to the server 102 and/or the network 115, or any other number suitable to the purposes of the environment 100.

Additionally, there may also be one or more additional clients 135 and/or mobile devices 110 external to the illustrated portion of environment 100 that are capable of interacting with the environment 100 via the network 115. Further, the term "client" and "user" may be used interchangeably as appropriate without departing from the scope of this disclosure. Moreover, while each client 135 and/or the mobile device 110 is described in terms of being used by a single user, this disclosure contemplates that many users may use one computer, or that one user may use multiple computers. As used in this disclosure, the client 135 is intended to encompass a personal computer, tablet computer, smart phone, cell phone, personal digital assistant (PDA), touch screen terminal, workstation, network computer, kiosk, one or more processors within these or other devices, or any other suitable processing device.

The illustrated mobile device 110 may be any mobile computing device such as a wireless data port, smart phone, personal data assistant (PDA), tablet computing device, one or more processors within these devices, or any other suitable processing device. For example, each client 135 and the mobile device 110 may include a computer that includes an input device, such as a keypad, touch screen, mouse (in the client 135 example), or other device that can accept user information, and an output device that conveys information associated with the operation of the computing systems 102, 125 or the client 135 or the mobile device 110 itself, including digital data, visual information, or a graphic user interface (GUI) 113, as shown with respect to the mobile device 110. In the example of the clients 135, both the input and output device may include fixed or removable storage media such as a magnetic storage media, CD-ROM, or other suitable media to both receive input from and provide output to users of the clients 135 through the display.

Further, the mobile device 110 includes the GUI 113 to interface with at least a portion of the environment 100 for any suitable purpose, including generating a visual representation of a web browser. Generally, through the GUI 113, the user is provided with an efficient and user-friendly presentation of data provided by or communicated within the system. The term "graphical user interface," or GUI, may be used in the singular or the plural to describe one or more graphical user interfaces and each of the displays of a particular graphical user interface. Therefore, the GUI 113 can represent any graphical user interface, including but not limited to, a web browser, touch screen, or command line interface (CLI) that processes information in the environment 100 and efficiently presents the information results to the user. In general, the GUI 113 may include multiple user interface (UI) elements, some or all associated with a web browser, such as interactive fields, pull-down lists, and buttons operable by the user at the mobile device 113. These and other UI elements may be related to or represent the functions of the web browser. In particular, the GUI 113 may be used to view and navigate various web pages located both internal and external to the server.

In some embodiments, one or more of the mobile device 110 (or mobile devices 110) and clients 135 may access one or more applications hosted on the software developer computing system 125 through a portal such as an enterprise portal, also known as an enterprise information portal (EIP) or corporate portal. The web portal (e.g., portal 204 illustrated in FIG. 2) may be a framework for integrating information, people and processes across organizational boundaries. It provides a secure unified access point, often in the form of a web-based user interface, and is designed to aggregate and personalize information through application-specific portlets. For example, the web portal may exhibit de-centralized content contribution and content management, which keeps the information always updated. With only a web browser, users can begin work once they have been authenticated in the portal which offers a single point of access to information, enterprise applications, and services both inside and outside an organization. Enterprise portals may present information from diverse sources in a unified way, and provide additional services, such as an internal search engine, e-mail, news, and various other features. Enterprise portals are often used by enterprises for providing their employees, customers, and possibly additional users with a consistent look and feel, and access control and procedures for multiple applications, which otherwise would have been separate entities altogether The illustrated environment 100 further includes user data 140, web content 150, and content items 160. In the illustrated embodiment, the user data 140 is stored by the memory 120 of the enterprise computing system 102. However, the user data 140 can be stored in any combination of the memory of the mobile device 110, the enterprise computing system 102, the software provider service computing system 125, the repository 130, and/or the clients 135. In some embodiments, the user data 140 is stored by a third party that provides networked online storage. In some embodiments, the user data 140 can include user profiles 180 of users of the clients 135 and the mobile device 110. The user profiles 180 can include associations of the users with backend systems that provide tasks to the user, described further below.

The illustrated web content 150 is the textual, visual or aural content that is encountered as part of the user experience on websites. The web content 150 may include, among other things: text, images, sounds, videos, applications, sub-applications, and animations. The web content is stored by any combination of the software provider service computing system 125 and the repository 130.

The illustrated content items 160 are sub-portions of the web content 150. The content items 160 are any kind of application, information, or service that can be visualized in a Web browser frame. The content items 160, in some embodiments, may be self-contained Web documents that are provided via a Uniform Resource Locator (URL) that are managed by the enterprise computing system 102. For example, the content items 160 can include alerts, reports, emails, calendars, text documents, multimedia files, reports, files, applications, and other content. For example, if a user enters a word in a dictionary content item 160, the definition appears inside the area of the content item 160. A link to usage examples, similar words, etc. can also be provided.

The illustrated content items 160 can include one or more of the characteristics of: stateless (not permanently connected to any component of the environment 100); embedded (non-dominant, parallel to other content items 160); provide previews on underlying processes and/or data; one-screen interactions; include only key functionality; provide direct access without navigation; push information and refresh periodically; integration with third-party software; and allow users to modify an appearance thereof. The content items 160 may provide data, for example, data that: provides active information; monitors business processes; previews data and processes; displays notifications for starting task-related processes; and offers access to often used data. The sub content items 160 may further provide direct access to simple applications; accelerated access to other applications; reduction of information and interaction to the necessary; and drag-and-relate that use outputs as inputs within the environment 100. The content items 160 offer customization such that specific content items 160, along with reduction of information and tailoring of information presented by the content items 160, can be implemented according to the user data 160.

As mentioned above, the content items 160 can include applications, such as a (universal) work list that provides a listing of tasks that a user may assigned to. The tasks can include responding to e-mails, approving documents, reviewing files, leave requests, purchase orders, etc. The tasks are provided by content sources (e.g., backend systems) and can further be associated with such content sources, described further below. As illustrated, the content items 160 are stored by the memory 120 of the enterprise computing system 102. However, the content items 160 can be stored in any combination of the memory the enterprise computing system 102, the software provider service computing system 125, and/or the repository 130. In some embodiments, the content items 160 can be provided by and stored by the third party content provider 170.

Figure 2:
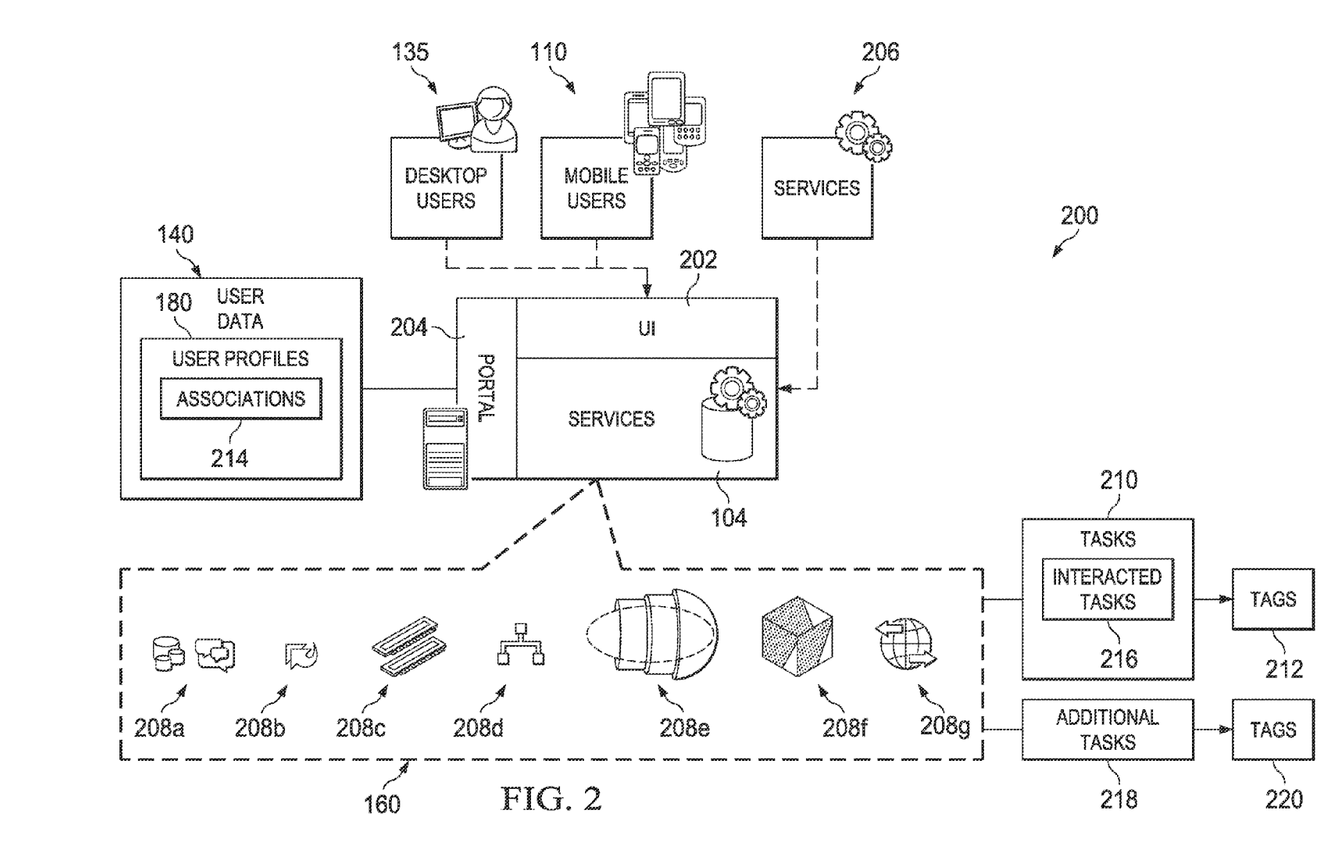
FIG. 2 illustrates an example environment of a distributed computing system operable to prioritize tasks.

FIG. 2 illustrates an example environment 200 of a distributed computing system operable to prioritize tasks. The environment 200 includes the clients 135, the mobile device 110, the task prioritization module 104, a graphical user interface (GUI) 202, a portal 204, services 206, content sources 208a-208g, the content items 160, and the user data 140 that includes the user profiles 180. The content items 160 further include tasks 210 and associated content source tags 212. The user profiles 180 further include associations 214. Users of the clients 135, users of the mobile device 110, or users of both ("users") access the tasks 210 through interaction with the GUI 202.

In the illustrated embodiment, the services 206 may facilitate communication between the task prioritization module 104 and the clients 135 and/or the mobile device 110 outside of the GUI 202. Accordingly, the clients 135 and the mobile device 110 may implement the functionality of the task prioritization module 104 without accessing the GUI 202 (i.e., without a UI layer), such as, for example, through a query.

The tasks 210 can be stored by, and retrieved from, the one or more content sources 208a-208g. Content source 208a, for instance, may include a collaboration module that stores, references, and/or accumulates content for sharing and other collaborative actions across multiple systems and/or user (such as across a business enterprise). For example, a collaborative environment or collaboration module in an enterprise environment may share and accumulate information (i.e., content) that enables users to share content and work together in mutual areas in the portal.

Content source 208b, for instance, may include an enterprise resource system (ERP) associated with the software developer computing system 125 that integrates internal and external business and management information across a business enterprise (e.g., finance/accounting, manufacturing, sales and service, and customer relationship management streams of data). The ERP system may facilitate the flow of information between all business functions inside the boundaries of the organization and manage the connections to outside customers and/or clients. The ERP system may include a client/server architecture with one or more databases with modifiable software executing thereon to provide an end-to-end business solution.

Content source 208c, for instance, may include content stored, referenced, and/or calculated on an in-memory database associated with the software developer computing system 125. The in-memory database may include integrated processing, i.e., all business and/or analytic operations done in processing memory. Moreover, content from business content sources may be replicated from one or more transactional systems (e.g., coupled to the network 115) to the in-memory database immediately. Thus, the in-memory database, in some aspects, may handle the analytical systems for all business data in real-time, as opposed to, for instance, computational processing systems that have separate transactional and analytical systems that connect through relational databases (i.e., relational databases stored on magnetic memory that require a process, e.g., ETL, to transfer data from one system to another not in real time but with a delay of an hour, day, week, or longer). In some embodiments, the in-memory database may expose business data and capabilities to improve an end-solution for end users (e.g., the clients 135). The in-memory database may reside on top of a computational engine that facilitates fast manipulations on large amounts of business data and/or replication of entire business suite information. Thus, in some embodiments, the in-memory database may provide for the following design principles/concepts: business data in real-time (e.g., GUI patterns for constantly updated business data); well modeled tables and data cubes (e.g., in order to provide semantic services); a highly parallelized computational engine (e.g., for computationally intensive GUI patterns such as real time alerts and/or suggestions); close coupling of business logic and business data (e.g., eliminating indexing and caching).

Content source 208d, for instance, may include a gateway technology associated with the software developer computing system 125 that provides a simple way to connect devices, environments and platforms based on market standards. For example, the gateway may, for example, be a front-end server to a business suite application and expose business suite services in an open protocol format. Exposed content may include, business and/or social data through social updates, for example, Twitter, Facebook, RSS feed/channels, and/or other feed sources or channels.

Content source 208e, for instance, may include a business object repository. Each business object stored in the repository, for example, may include a capsule with an internal hierarchical structure, behavior offered by its operations, and integrity constraints. In general, the overall structure of the business object model ensures the consistency of the interfaces that are derived from the business object model. The derivation helps ensure that the same business-related subject matter or concept can be represented and structured in the same way in various interfaces. The business object model defines the business-related concepts at a central location for a number of business transactions. In other words, it reflects the decisions made about modeling the business entities of the real world acting in business transactions across industries and business areas. The business object model is defined by the business objects and their relationship to each other (the overall net structure).

Business objects are generally semantically disjointed, i.e., the same business information is represented once. In some embodiments, the business objects are arranged in an ordering framework such that they can be arranged according to their existence dependency to each other. For example, in a modeling environment, the customizing elements might be arranged on the left side of the business object model, the strategic elements might be arranged in the center of the business object model, and the operative elements might be arranged on the right side of the business object model. Similarly, the business objects can be arranged in this model from the top to the bottom based on defined order of the business areas, e.g., finance could be arranged at the top of the business object model with customer relationship management (CRM) below finance and supplier relationship management (SRM) below CRM. To help ensure the consistency of interfaces, the business object model may be built using standardized data types as well as packages to group related elements together, and package templates and entity templates to specify the arrangement of packages and entities within the structure.

A business object may be defined such that it contains multiple layers. Typical business object may contain four layers: a kernel layer, an integrity layer, an interface layer, and an access layer. The innermost layer of the example business object is the kernel layer. The kernel layer represents the business object's inherent data, containing various attributes of the defined business object. The second layer represents the integrity layer. The integrity layer contains the business logic of the object. Such logic may include business rules for consistent embedding in a computing environment and the constraints regarding the values and domains that apply to the business object. Business logic may include statements that define or constrain some aspect of the business, such that they are intended to assert business structure or to control or influence the behavior of the business entity. It may pertain to the facts recorded on data and constraints on changes to that data. In effect, business logic may determine what data may, or may not, be recorded in business object. The third layer, the interface layer, may supply the valid options for accessing the business object and describe the implementation, structure, and interface of the business object to the outside world. To do so, the interface layer may contain methods, input event controls, and output events. The fourth and outermost layer of the business object is the access layer. The access layer defines the technologies that may be used for external access to the business object's data. Some examples of allowed technologies may include COM/DCOM (Component Object Model/Distributed Component Object Model), CORBA (Common Object Request Broker Architecture), RFC (Remote Function Call), Hypertext Transfer Protocol (HTTP) and Java, among others. Additionally, business objects of this embodiment may implement standard object-oriented technologies such as encapsulation, inheritance, and/or polymorphism.

Content source 208f, for instance, may include, a business intelligence module that, at a high level, provides software and/or middleware services for performance analytics (e.g., supports organizational efforts to develop sophisticated visual representations of processes and performance, providing organizations with new insights that can help them make more informed decisions, assess and plan a business intelligence strategy, deploy dashboard tools, generate management and operational reports, and build an IT infrastructure that provides high scalability for users and data); services for analytic applications (e.g., provides guidance and deployment expertise in implementing analytic applications, offering pre-built analytics and data models to help a customer with a specific business problem in various industries, helping organizations to efficiently deploy applications); and introductory business intelligence services (e.g., introduces organizations to the dynamics of using business intelligence, providing the ability to leverage the functionality of business intelligence—such as executive dashboards and operational reports—without initiating a full-scale implementation).

Content source 208f, for instance, may be content from third party platforms, such as content from third parties unaffiliated with, for example, the software developer computing system 125 and enterprise computing system 102. For instance, content source 208f may be content from third party content provider 170.

As mentioned above, the clients 135 and the mobile device 110 are provided the tasks 210 from one or more content sources 208a-208g. To that end, the tasks 210 provided to the clients 135 and the mobile device 110 by the content sources 208a-208g can be prioritized. Specifically, to prioritize the tasks 210, a user profile 180 in the portal 204 is identified that includes the associations 214 between the user profile 180 associated with a user and the content sources 208a-208g. The content sources 208a-208g associated with the tasks 210 are compared to the associations 214 stored by the user profile 180. For example, the content source tags 212 associated with the tasks 210 are compared to the associations 214 of the user profile 180. In some embodiments, a ranking value of the tasks 210 is provided by the comparison. The tasks 210 are ranked based on the comparison to define a ranked list of tasks 210. In some embodiments, the tasks 210 are ranked based on the ranking value of the respective tasks 210. A subset of the ranked list of tasks 210 are prepared for display on the clients 135 and/or the mobile device 110.

Specifically, a user profile 180 is identified that includes associations 214 between the user profile 180 associated with the user and the content sources 208a-208g. The tasks 210 can be associated with content source tags 212. The content source tags 212 can be a keyword or a term that is associated with the tasks 210 and that describes a source of the task 210 (e.g., a name of the content source 208a-208g or a word associated with the content source 208a-208g). In some embodiments, the associations 214 of the user profile 180 can be between the user profile 180 and the content source tags 212. For example, a user can receive, for display on the mobile device 110, a purchase order task 210 provided by the content source 208b. The purchase order task 210 can be associated with the content source tag 212 that describes the content source 208b. In some embodiments, the content source tags 212 that are associated with the tasks 210 are included by metadata of the tasks 210. In some embodiments, a task 210 can be associated with more than one content source tag 212. In some embodiments, two or more tasks 210 can be associated with the same content source tag 212.

In some embodiments, the associations 214 of the user profile 180 further include associations between the user profile 180 and a type of the task 210. For example, the type of the task 210 can include a category of the task (e.g., approval tasks, review tasks, action tasks); and a role of a user associated with task (e.g., manager role, human resources role, developer role). In some embodiments, the associations 214 of the user profile 180 are further between the user profile 180 and a type of the task for each content source 208a-208g. In some embodiments, the associations 214 of the user profile 180 are further between the user profile 180 and an identification of the content source 208a-208g. In some embodiments, the portal 204 detects which content source tags 212 are associated with the tasks 210. In some embodiments, the task prioritization module 104 detects which content source tags 212 are associated with the tasks 210.

As mentioned above, the user data 140 can include the user profile 180 for each user of the clients 135 and the mobile device 110 that interact with the portal 204. Also, as mentioned above, the user profile 180 of each user can include the associations 214. To that end, for a particular user of the mobile device 110 or the clients 135, the content sources 208a-208g associated with the tasks 210 are compared to the associations 214 stored by the user profile 180. Specifically, the content source tags 212 that are associated with the tasks 210 can be compared to the associations 214 of the user profile 180 associated with the particular user.

In some embodiments, comparing the content source tags 212 that are associated with the tasks 210, with the associations 214 of the user profile 180 can include matching the content source tags 212 with the associations 214. Matching the content source tags 212 with the associations 214 can include matching the respective associated content sources 208a-208g of the content source tags 212 and the associations 214. For example, a content source tag 212 associated with a particular task 212 indicates the source of the particular task 212 is the content source 208a. Continuing the example, an association 214 of the user profile 180 is between the user profile 180 and the content source 208a. Thus, the content source tag 212 matches at least one of the associations 214 stored by the user profile 180.

In some embodiments, the tasks 210 are associated with ranking values. Specifically, in some embodiments, a ranking value of the tasks 210 are based on the matching between the content source tags 212, associated with the tasks 210, and the associations 214 of the user profile 180. In some embodiments, the ranking value of a task 212 can be based on a number of associations 214 of the user profile 180 that are matched to the content source tags 212. For example, each task 210 associated with a particular content source 208a-208g that is interacted with by the user can increased an association count for the association 214 between the user profile 180 and the particular content source 208a-208g. For instance, the content source 208c provides five tasks 210 to the user that the user interacts with, and thus the association count of the association 214 of the user profile 180 between the user profile 180 and the content source 208c can be reflective of the number of tasks provided by the content source 208c and interacted with by the user (e.g., five associations). Thus, the ranking value of the task 212 provided by the content source 208c can be based on the association count (e.g., five) of the association 214 between the user profile 180 and the content source 208c.

In some embodiments, a higher association count of the association 214 of the user profile 180 that is matched to a content source tag 212 associated with a particular task 210 can result in a higher ranking value of the respective task 210 (and similarly, a lower association count of the association 214 can result in a lower ranking value of the respective task 210). In some embodiments, the task prioritization module 104 compares the content source tags 212 associated with the tasks 210 to the associations 214 of the user profile 180 associated with the particular user.

The tasks 210 are ranked based on the comparison of the content sources 208a-208g associated with the tasks 210 to the associations 214 stored by the user profile 180. Based on this comparison, the tasks 210 are ranked to define a ranked list of tasks 210. Specifically, the tasks 210 may be ranked based on the comparison of the content source tags 212 that are associated with the tasks 210 to the associations 214 of the user profile 180 associated with the particular user. As mentioned above, the tasks 210 can be associated with a ranking value. The tasks 210 can be ranked (e.g., ordered) based on the respective ranking value. In some embodiments, the tasks 210 are ranked based on the ranking value from a highest ranking value to a lowest ranking value. In some embodiments, only a subset of the tasks 210 are ranked. In some embodiments, only a subset of the tasks 210 are ranked that have respective ranking values above a ranking threshold. In some embodiments, the task prioritization module 104 ranks the additional tasks 210.

A subset of the ranked list of tasks 210 is prepared for display on the clients 135 and the mobile device 110. For example, the ranked list of tasks 210 is displayed by the GUI 113 of the mobile device 110. In some embodiments, the subset of the ranked list of tasks 210 can include tasks 210 having a ranking value above the ranking threshold. In some embodiments, the subset of the ranked list of tasks 210 is based on a screen display size of the clients 135 and/or the mobile device 110. For example, as mentioned above, the mobile device 110 has a fixed display size. The number of tasks 210 that are provided in the subset of the ranked list of tasks 210 can be based on the display size of the mobile device 110. For example, the number of tasks 210 provided to the mobile device 110 is a number of tasks 210 that can be sufficiently (e.g., as determined by a software developer or IT manager) displayed on the mobile device 110 and that is easily navigable by the user of the mobile device 110 (e.g., the number of tasks 210 is based on the capabilities of the mobile device 110). A larger display size of the mobile device 110 can facilitate display of a larger number of tasks 210 of the subset of the ranked list of additional tasks 218.

In some further embodiments, the ranking of the tasks 210 can be based on receiving a location of the user of the mobile device 110. The location of the user of the mobile device 110 can be determined by using a global positioning system (GPS), Wi-Fi locations, and/or cellular telephone towers (e.g., cellular tower location triangulation). Additionally, location tags can associated with the tasks 210 (e.g., a specific GPS coordinate, a general area (e.g., a city park), a metropolitan area (e.g., Austin, Tex.), or any other location defining area). The current location of the user of the mobile device 110 can be compared to the location tags of the tasks 210, similar to that mentioned above. Based on the matching of the location of the mobile device 110 and the location tags, the ranking value of the associated task 210 can be altered.

In some further embodiments, the ranking of the tasks 210 can be altered based on user interaction with the tasks 210. Specifically, as mentioned above, the subset of the ranked list of tasks 210 are prepared for display on the clients 135 and/or the mobile device 110. The user can interact with the tasks 210 of the subset of the ranked list of tasks 210 by such interactions as viewing one of the tasks 210 and/or changing a state of one of the tasks 210. Changing the state of one of the tasks 210 can include, for example, approving the task 210, rejecting the task 210, postponing the task 210, responding to the task 210, or forwarding the task 210, to name but a few interactions. Additionally, an organization associated with the clients 135 and/or the mobile device 110 can provide additional actions according to specific organization needs. The user interaction with the subset of the ranked list of tasks 210 can be received to define interacted-tasks 216. The interacted-tasks 216 can include any portion (e.g., subset) or all of the tasks 210 or can include new tasks (e.g., tasks not previously included by tasks 210); or can include a combination of any portion (or all) of the tasks 210 and new tasks.

The content sources 208a-208g can be detected that are associated with the interacted-tasks 216 (e.g., the count sources 208a-208g that provide the interacted tasks 216 to the user). Specifically, the content source tags 212 can be detected that are associated with each of the interacted-tasks 216, similar to that as mentioned above. For each interacted-task 216, an additional association (analogous to the associations 214) between the user profile 180 associated with the user providing the user interaction and the content source 208a-208g associated with the interacted-task 216 can be stored by the user profile 180.

To that end, the user can receive additional tasks 218 (analogous to the tasks 210). For each additional task 218, the content source 208a-208g associated with the additional task 218 can be compared with the associations 214 (including the additional associations) stored by the user profile 180 associated with the user. Specifically, the content source tags 220 (analogous to the content source tags 212) that are associated with the additional tasks 218 are compared with the associations 214 (including the additional associations). In some embodiments, similar to that mentioned above, comparing the content source tags 220 that are associated with the additional tasks 218 with the associations 214 (including the additional associations) of the user profile 180 can include matching the content source tags 220 with the associations 214 (including the additional associations). Matching the content source tags 220 with the associations 214 (including the additional associations) can include matching the respective associated content sources 208a-208g of the content source tags 220 and the associations 214 (including the additional associations).

The tasks 210 are ranked based on the comparison of the content sources 208a-208g associated with the tasks 210 to the associations 214 stored by the user profile 180 to defined a ranked list of tasks 210. Specifically, the tasks 210 are ranked based on the comparison of the content source tags 212 that are associated with the tasks 210 to the associations 214 of the user profile 180 associated with the particular user.

In some embodiments, the associations 214 (including the additional associations) stored by the user profile 180 that are associated with the tasks 210 (and the additional tasks 218) can be weighted (e.g., weighted associations). Thus, when comparing the content sources 208a-208g associated with the tasks 210 and the associations 214 (including the additional associations) stored by the user profile 180, the ranking value of the tasks 210 can be based on the weight of the associations 214 (including the additional associations). Thus, the more weighted an association 214 is, the more the ranking value of the task 210 (or additional task 218) can be altered. To that end, the weight of the associations 214 (including the additional associations) stored by the user profile 180 can be based on a type of user interaction (e.g., viewing one of the tasks 210 or changing the states of one of the tasks 210).

In some embodiments, the ranking value associated with the user interaction of changing the state of the tasks 210 is greater than the ranking value associated with the user interaction of viewing the tasks 210. In some embodiments, the type of the user interaction can further include a time duration of interaction (e.g., the more time an user interaction is can result in a heavier weighting); and how often the interaction occurs (e.g., the more often the user interacts with a task associated with a content source can result in a heavier weighting). In some embodiments, the type of the user interaction, the time duration, and/or the frequency of the interaction can decrease the weighting of the associations 214 stored by the user profile 180.

Figure 3:
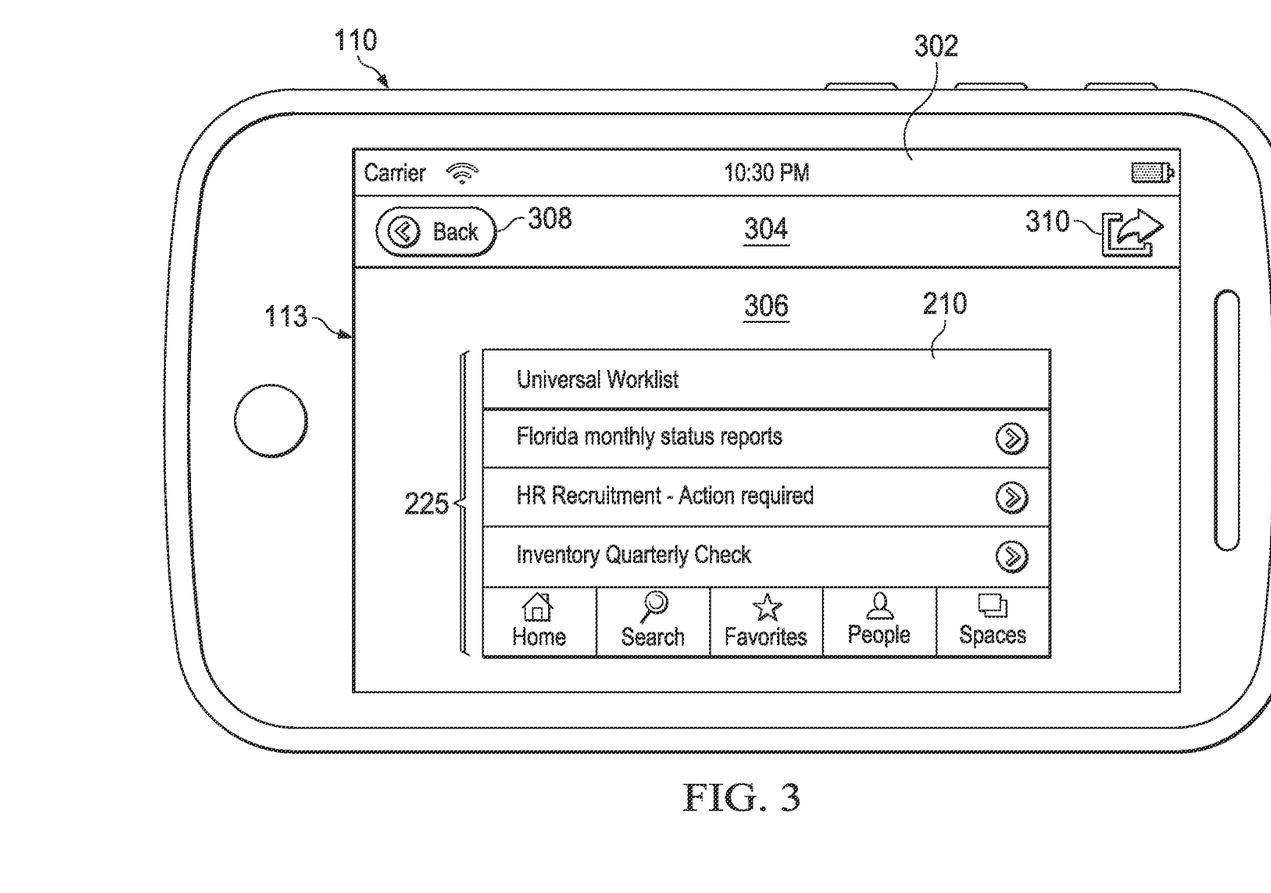
FIG. 3 illustrates the graphical user interface (GUI) of the mobile device depicting the subset of the ranked list of tasks.

FIG. 3 illustrates an example graphical user interface (GUI) 113 of the mobile device 110 depicting the subset of the ranked list of tasks 220. The illustrated GUI 113 includes a status bar 302, a navigation bar 304, and a content area 306. The status bar 302 can include information about the mobile device 110, such as carrier type, connection type, current time, and battery life. The information displayed by the status bar 302 varies and is specific to the operating system executed by the mobile device 110. The navigation bar 304 can include a navigation button 308 that facilitates navigation between the subset of the ranked list of tasks 210 and the individual tasks 210. The navigation bar 304 can also include a sharing button 310. The sharing button 310 provides differing avenues of sharing one or more of the tasks 210, such as, sharing the tasks 210 by e-mail, text message, or a social networking platform. The content area 306 provides display of the subset of the ranked list of tasks 210, or upon selection of one of the tasks 210, the individual task 210.

The subset of the ranked list of tasks 210 is provided for interaction with by the user of the mobile device 110. As shown, the subset of the ranked list of tasks 210 displays a listing of three tasks 210; however, the subset of the ranked list of tasks 210 can include any number of tasks 210 depending upon, for example, the screen display size and/or the operating system of the mobile device 110. Further, the number of listing of tasks 210 that is displayed can be altered depending on whether the mobile device 110 is in landscape or portrait mode. Additionally, the subset of the ranked list of tasks 210 can be scrollable such that additional listing of tasks 210 can be displayed by scrolling the subset of the ranked list of tasks 210. To that end, upon selection of one of the tasks 210, data relating to the selected task 210 can be displayed by the mobile device 110 within the content area 306.

Figure 4:
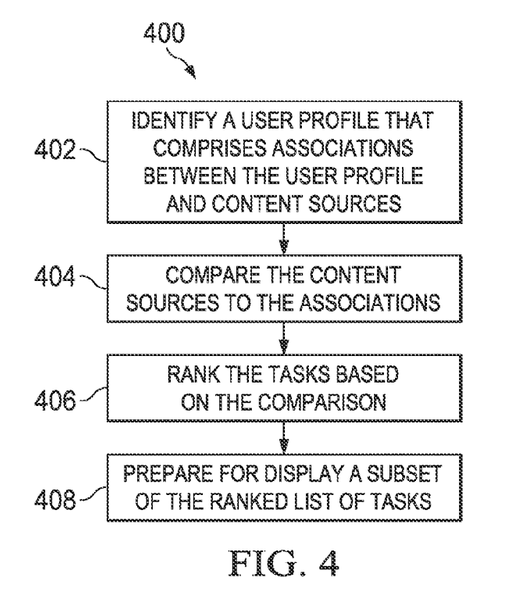
FIG. 4 illustrates an example method for providing prioritized tasks.

FIG. 4 illustrates an example method 400 for providing prioritized tasks. The example method 400 can be executed, for example, by the task prioritization module 104, using one or more computing devices. For example, any combination of the computing systems 102, 125 and the mobile device 110 can be used to execute the example process 300 and obtain any data from the memory of the mobile device 110, the computing systems 102, 125, the repository 130, and/or the clients 135.

In step 402, a user profile is identified that includes one or more associations between the user profile, associated with a user, and one or more content sources. For example, the task prioritization module 104 or the portal 204 identifies the user profile 180 that includes associations 214 between the user profile 180 and the content sources 208a-208g.

In step 404, for each task of one or more tasks, the content source associated with the task is compared to the associations stored by a user profile of a user in the portal. The content sources provide the tasks. Specifically, for each task, the content source tag associated with the task is compared to the associations stored by the user profile of the user in the portal. For example, the task prioritization module 104 compares the content source tags 212 associated with the tasks 210 to the associations 214 stored by the user profile 180.

In step 406, based on the comparison, the tasks are ranked to define a ranked list of tasks. For example, the task prioritization module 104 ranks the tasks 210 based on the comparison of the content source tags 212 associated with the tasks 210 to the associations 214 stored by the user profile 180. The task prioritization module 104 can assign ranking values to the tasks 210 based on the comparison. Additionally, based on this ranking, the task prioritization module 104 defines a ranked list of tasks 210.

In step 408, a subset of the ranked list of tasks is prepared for display on the mobile device. For example, the tasks prioritization module 104 or the portal 204 prepares a subset of the ranked list of tasks 210 for display on the mobile device 110. In some embodiments, the subset of the ranked list of tasks 210 can include tasks 210 having a ranking value greater than a ranking threshold.

Figure 5:
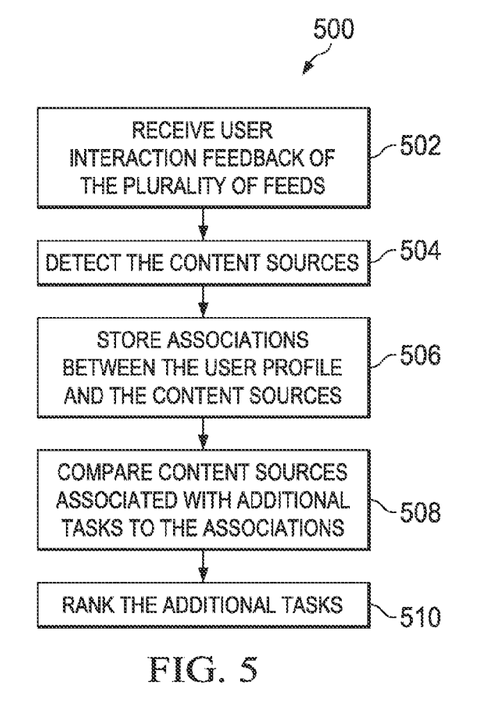
FIG. 5 illustrates an example method for providing prioritized tasks based on user interaction.

FIG. 5 illustrates an example method 500 for providing prioritized tasks based on user interaction. The example method 500 can be executed, for example, by the task prioritization module 104, using one or more computing devices. For example, any combination of the computing systems 102, 125 and the mobile device 110 can be used to execute the example process 300 and obtain any data from the memory of the mobile device 110, the computing systems 102, 125, the repository 130, and/or the clients 135.

In step 502, after preparing for display the subset of the ranked list of tasks in step 408, feedback is received indicating a user interaction with the tasks of the subset of the ranked list of tasks to define interacted-tasks. For example, the portal 204 or the task prioritization module 104 receives feedback indicating interaction by the user with the tasks 210 of the subset of the ranked list of tasks 220 that are provided by the mobile device 110. The tasks 210 that are interacted with by the user are defined as interacted-tasks 216.

In step 504, for each interacted-task, the content source associated with the interacted-task is detected. For example, for each interacted-task 216, the content source 208a-208g that is associated with the interacted-task 216 is detected.

In step 506, for each interacted-task, storing, by the user profile associated with the user providing the user interaction, an additional association between the user profile and the content source associated with the interacted-task. For example, the task prioritization module 104 or the portal 204, for each interacted-task 216, stores by the user profile 180 an additional association between the user profile 180 and the content course 208a-208g associated with the interacted-task 216.

In step 508, for each additional task, the content source associated with the additional task is compared to the associations and the additional associations stored by the user profile. For example, the task prioritization module 104, for each additional task 218, compares the content source 208a-208g associated with the additional task 218 to the associations 214 (including the additional associations) with the user profile 180. Specifically, the task prioritization module 104, for each additional task 218, compares the content source tag 220 associated with the additional task 218 to the associations 214 (including the additional associations) with the user profile 180

In step 510, ranking, based on the comparison, the additional tasks to define a ranked list of additional tasks. For example, the tasks prioritization module 104, based on the comparison, ranks the additional tasks 218 to define the ranked list of additional tasks 218.

A number of implementations have been described. Nevertheless, it will be understood that various modifications may be made. For example, other methods described herein besides or in addition to those illustrated with reference to FIGS. 1-5 may be performed. Further, the illustrated steps of methods 400 and 500 may be performed in different orders, either concurrently or serially. Further, steps may be performed in addition to those illustrated in methods 400 and 500, and some steps illustrated in methods 400 and 500 may be omitted without deviating from the present disclosure. Accordingly, other implementations are within the scope of the following claims.

What is claimed is:

1. A computer-implemented method of providing a prioritized task list to a mobile device, the method comprising:
   identifying a user profile in a portal that comprises one or more associations between the user profile, associated with a user, and one or more backend systems;
   receiving one or more tasks from the one or more backend systems, at least one task of the one or more tasks received from a first backend system of the one or more backend systems and the remaining tasks of the one or more tasks received from a second backend system that is separate from the first backend system;
   comparing, for each task of the one or more tasks, the backend system that the task is received from and the associations stored by the user profile;
   ranking, based on the comparison of the backend systems and the associations, the one or more tasks to define a ranked list of tasks; and
   preparing a subset of the ranked list of tasks for display on the mobile device.

2. The computer-implemented method of claim 1, wherein comparing further comprises comparing, for each task of the one or more tasks, a content source tag associated with the task and the associations stored by the user profile.

3. The computer-implemented method of claim 1, wherein comparing further comprises matching one or more of the tasks with one or more of the associations based on the backend system associated with the task and the backend system of the associations.

4. The computer-implemented method of claim 1, wherein ranking further comprises at least one of:
   providing a ranking value to each of the tasks based on the comparison; or ordering the tasks based on the ranking value from a highest ranking value to a lowest ranking value.

5. The computer-implemented method of claim 1, further comprising:
receiving user feedback indicating user interaction with the tasks of the subset of the ranked list of tasks to define one or more interacted-tasks;
detecting, for each interacted-task, the backend system that the interacted-task is received from;
storing, by the user profile associated with the user providing the user feedback, for each interacted-task of the one or more interacted tasks, an additional association between the user profile and the backend system that the interacted-task is received from;
comparing, for each task of one or more additional tasks, the backend system that the additional task is received from with the associations and the additional associations stored by the user profile; and
ranking, based on the comparing, the additional tasks to define a ranked list of additional tasks.

6. The computer-implemented method of claim 5, further comprising:
providing, for each task, a ranking value to the task based on a type of the user interaction with the tasks of the subset of the ranked list of tasks.

7. The computer-implemented method of claim 6, wherein the user interaction comprises at least one of viewing the task or changing a state of the task.

8. The computer-implemented method of claim 7, wherein the ranking value associated with the user interaction of changing the state of the task is greater than the ranking value associated with the user interaction of viewing the task.

9. The computer-implemented method of claim 1, wherein the associations are further between the user profile and a type of the task; or the associations are further between the user profile and identifications of the backend system.

10. A computer storage medium encoded with a computer program, the program comprising instructions that when executed by one or more computers cause the one or more computers to perform operations comprising:
identifying a user profile in a portal that comprises one or more associations between the user profile, associated with a user, and one or more backend systems;
receiving one or more tasks from the one or more backend systems, at least one task of the one or more tasks received from a first backend system of the one or more backend systems and the remaining tasks of the one or more tasks received from a second backend system that is separate from the first backend system;
comparing, for each task of the one or more tasks the backend system that the task is received from and the associations stored by the user profile;
ranking, based on the comparison of the backend systems and the associations, the one or more tasks to define a ranked list of tasks; and
preparing a subset of the ranked list of tasks for display on the mobile device.

11. The computer storage medium of claim 10, wherein the operation of comparing further comprising comparing, for each task of the one or more tasks, a content source tag associated with the task and the associations stored by the user profile.

12. The computer storage medium of claim 10, wherein the operation of comparing further comprises matching one or more of the tasks with one or more of the associations based on the backend system associated with the task and the backend system of the associations.

13. The computer storage medium of claim 10, wherein the operations further comprise:
receiving user feedback indicating user interaction with the tasks of the subset of the ranked list of tasks to define one or more interacted-tasks;
detecting, for each interacted-task, the backend system that the interacted-task is received from;
storing, by the user profile associated with the user providing the user feedback, for each interacted-task of the one or more interacted-tasks, an additional association between the user profile and the backend system that the interacted-task is received from;
comparing, for each task of one or more additional tasks, the backend system that the additional task is received from with the associations and the additional associations stored by the user profile; and
ranking, based on the comparing, the additional tasks to define a ranked list of additional tasks.

14. The computer storage medium of claim 13, wherein the operations further comprise:
providing, for each task, a ranking value to the task based on a type of the user interaction with the tasks of the subset of the ranked list of tasks.

15. The computer storage medium of claim 14, wherein the user interaction comprises at least one of viewing the task or changing a state of the task.

16. The computer storage medium of claim 15, wherein the ranking value associated with the user interaction of changing the state of the task is greater than the ranking value associated with the user interaction of viewing the task.

17. A computing system comprising one or more memory modules, one or more processors, and instructions stored on one or more of the memory modules and operable when executed with the one or more processors to perform operations comprising:
identifying a user profile in a portal that comprises one or more associations between the user profile, associated with a user, and one or more backend systems;
receiving one or more tasks from the one or more backend systems, at least one task of the one or more tasks received from a first backend system of the one or more backend systems and the remaining tasks of the one or more tasks received from a second backend system that is separate from the first backend system;
comparing, for each task of the one or more tasks, the backend system that the task is received from and the associations stored by the user;
ranking, based on the comparison of the backend systems and the associations, the one or more tasks to define a ranked list of tasks; and
preparing a subset of the ranked list of tasks for display on the mobile device.

18. The computing system of claim 17, wherein the operation of comparing further comprises comparing, for each task of the one or more tasks, a content source tag associated with the task and the associations stored by the user profile.

19. The computing system of claim 17, wherein the operation of comparing further comprises matching one or more of the tasks with one or more of the associations based on the backend system associated with the task and the backend system of the associations.

20. The computing system of claim 17, wherein the operations further comprise:
receiving user feedback indicating user interaction with the tasks of the subset of the ranked list of tasks to define one or more interacted-tasks;

detecting, for each interacted-task, the backend system that the interacted-task is received from;

storing, by the user profile associated with the user providing the user feedback, for each interacted-task of the one or more interacted tasks, an additional association between the user profile and the backend system that the interacted-task is received from;

comparing, for each task of one or more additional tasks, the backend system that the additional task is received from with the associations and the additional associations stored by the user profile; and ranking, based on the comparing, the additional tasks to define a ranked list of additional tasks.

21. The computing system of claim 20, wherein the operations further comprise:

providing, for each task, a ranking value to the task based on a type of the user interaction with the tasks of the subset of the ranked list of tasks.

* * * * *